US008089790B2

United States Patent
Jung et al.

(10) Patent No.: US 8,089,790 B2
(45) Date of Patent: Jan. 3, 2012

(54) POWER SUPPLY INPUT DEVICE

(75) Inventors: Jee-hoon Jung, Yongin-si (KR);
Joong-gi Kwon, Gunpo-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 338 days.

(21) Appl. No.: 12/023,421

(22) Filed: Jan. 31, 2008

(65) Prior Publication Data
US 2008/0310197 A1 Dec. 18, 2008

(30) Foreign Application Priority Data

Jun. 13, 2007 (KR) .......................... 10-2007-0058008

(51) Int. Cl.
*H02M 5/42* (2006.01)
*H02M 7/757* (2006.01)
*H02M 7/06* (2006.01)
(52) U.S. Cl. .................. 363/84; 363/81; 363/126
(58) Field of Classification Search .................... 363/44, 363/50, 78, 81, 84, 126, 56.02–56.03
See application file for complete search history.

(56) References Cited

U.S. PATENT DOCUMENTS

| 5,426,579 | A * | 6/1995 | Paul et al. | 363/126 |
| 7,046,529 | B2 * | 5/2006 | Chang | 363/44 |
| 7,129,594 | B2 * | 10/2006 | Iwatani et al. | 290/40 C |
| 2003/0031035 | A1 * | 2/2003 | Kitano | 363/49 |
| 2003/0214825 | A1 * | 11/2003 | Lee | 363/84 |

OTHER PUBLICATIONS

Electus Distribution, "Optocouplers: When and How To Use Them", 2001, Electus Distribution.*

* cited by examiner

*Primary Examiner* — Adolf Berhane
*Assistant Examiner* — Jeffrey Gblende
(74) *Attorney, Agent, or Firm* — Staas & Halsey LLP

(57) ABSTRACT

A power supply input device including a first resistance of a discharge resistance conversion unit connected in parallel to a discharge resistance unit; and a switching unit of the discharge resistance conversion unit connected to the first resistance and performing a switching operation according to an externally received control signal, thus minimizing power losses occurring when a system is in a standby mode.

10 Claims, 4 Drawing Sheets

POWER SUPPLY INPUT DEVICE

CROSS-REFERENCE TO RELATED APPLICATION

This application claims the benefit of Korean Application No. 2007-58008, filed on Jun. 13, 2007, in the Korean Intellectual Property Office, the disclosure of which is incorporated herein by reference.

BACKGROUND OF THE INVENTION

1. Field of the Invention

An aspect of the present invention relates to a power supply apparatus, and more particularly, to a power supply input device for converting a discharge resistance in a power supply apparatus.

2. Description of the Related Art

Due to the depletion of fossil fuels and environmental problems, restrictions are being enforced to reduce a standby power of an electric or electronic device thus reducing unnecessary energy consumption. Therefore, a technique for reducing the standby power is being used as a marketing point that appeals to users.

FIG. 1 is a block diagram illustrating a conventional power supply input device having a discharge resistance. The conventional power supply input device includes an alternating current (AC) power supply unit 10, a line filter 20, a bridge diode 30, a direct current (DC) condenser 40, and a discharge resistance unit 50 that is connected to both terminals of the DC condenser 40 of the conventional power supply input device.

The discharge resistance unit 50 has the following functions. If an input supply voltage of a power supply apparatus that is being operated is momentarily applied, electrical energy stored in the DC condenser 40 is consumed only by its effective series resistance (ESR). Therefore, a potential of the DC condenser 40 gradually decreases.

However, according to the characteristics of a pulse width modulation (PWM) integrated circuit (IC) that controls the power supply apparatus, only when the DC potential decreases to a predetermined voltage or less, the power supply apparatus is reset and normally operated. Therefore, when a user applies the input supply voltage in order to re-operate the system before the DC potential decreases to the reset voltage or less, there is a problem in that the PWM IC is not reset and cannot be re-operated.

To solve the aforementioned problem, the discharge resistance unit 50 is provided to both terminals of the DC condenser 40 so that the DC condenser 40 can be rapidly discharged. However, when the discharge resistance unit 50 is used as described above, and the system is in a standby mode, a large amount of energy is lost by the discharge resistance unit 50 of the power supply apparatus. When the system has a high input voltage or uses a voltage doubler, the energy loss further increases, and a standby current efficiency of the system may further decrease.

SUMMARY OF THE INVENTION

An aspect of the present invention provides a power supply input device capable of minimizing current losses when a system is in a standby mode.

According to an aspect of the present invention, there is provided a power supply input device that has an alternating current (AC) power supply unit, a line filter, a bridge diode, a direct current (DC) condenser, a discharge resistance unit, and a discharge resistance conversion unit, including: a first resistance of the discharge resistance conversion unit connected to the discharge resistance unit in parallel; and a switching unit of the discharge resistance conversion unit connected to the first resistance and performing a switching operation according to an externally received control signal.

According to another aspect of the present invention, a resistance value of the first resistance is lower than a resistance value of the discharge resistance unit by a predetermined value.

According to another aspect of the present invention, the switching unit may include: a bipolar junction transistor connected to the first resistance; a second resistance connected between a base of the bipolar junction transistor and the first resistance; a first photo coupler connected to the second resistance; and a third resistance connected to the first photo coupler.

According to another aspect of the present invention, the second resistance may have a value so as to operate the bipolar junction transistor.

According to another aspect of the present invention, the control signal may function as a ground signal in a normal operation mode, and function as a high impedance signal in a standby mode.

According to another aspect of the present invention, in the normal operation mode, a current that flows through the first photo coupler may be blocked, and the bipolar junction transistor may be turned on.

According to another aspect of the present invention, in the standby mode, a current may be supplied to the first photo coupler, and the bipolar junction transistor may be turned off.

According to another aspect of the present invention, the switching unit may include: a metal-oxide semiconductor field effect transistor (MOSFET) connected to the first resistance; a fourth resistance connected to a gate of the MOSFET; a fifth resistance connected to the fourth resistance; a second photo coupler connected to the fourth and fifth resistances; and a sixth resistance connected to the second photo coupler.

According to another aspect of the present invention, the fifth resistance may have a resistance value so as to operate the MOSFET.

According to another aspect of the present invention the control signal may function as a ground signal in a normal operation mode, and function as a high impedance signal in a standby mode.

According to another aspect of the present invention, in the normal operation mode, a current that flows through the second photo coupler may be blocked, and the MOSFET may be turned on.

According to another aspect of the present invention, in the standby mode, a current may be supplied to the second photo coupler, and the MOSFET may be turned off.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
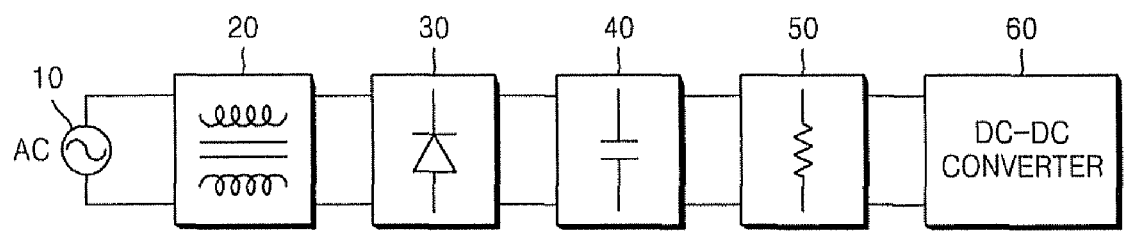
FIG. 1 is a block diagram for explaining a conventional power supply input device.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
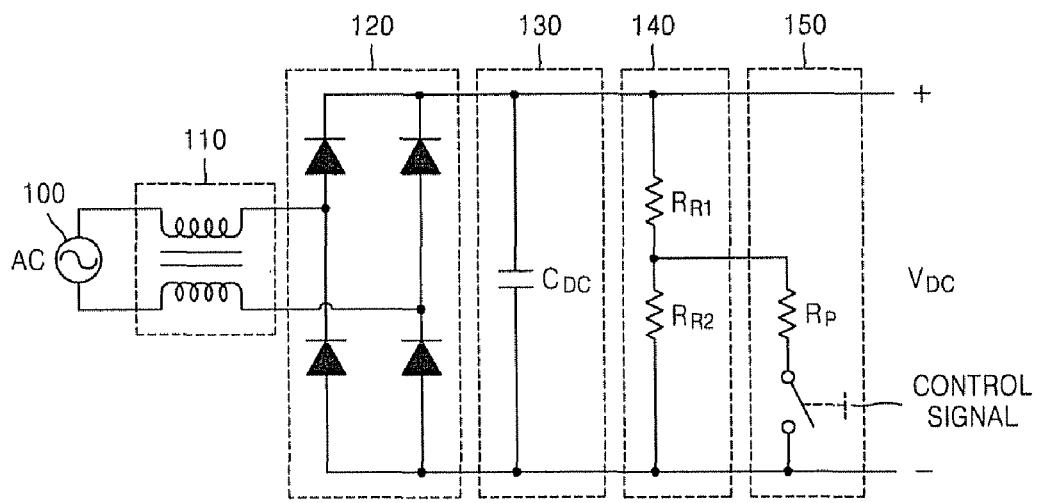
FIGS. 2A and 2B are circuit diagrams for explaining a power supply input device according to an embodiment of the present invention.
Figure 2B:
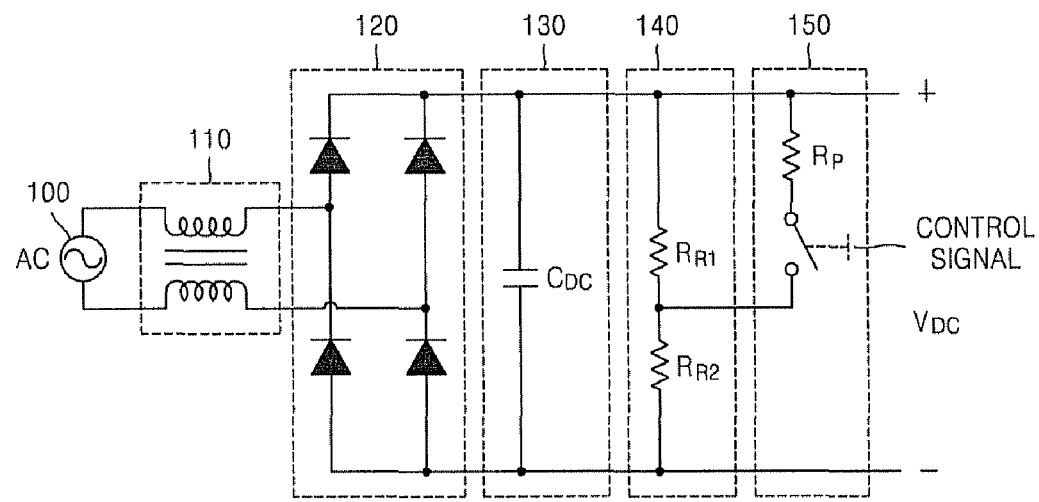

FIGS. 2A and 2B are circuit diagrams for explaining the power supply input device according to embodiments of the present invention.

Functions of an alternating current (AC) power supply unit 100, a line filter 110, a bridge diode 120, a direct current (DC) condenser 130, and a discharge resistance unit 140 illustrated in FIG. 2A or 2B are the same as those of the components of a conventional power supply input device, as described above, and thus, a detailed description thereof is omitted. A discharge resistance conversion circuit 150 corresponding to the embodiments of the present invention is described in detail. As illustrated in FIG. 2B, the discharge resistance conversion circuit 150 is connected in parallel to a resistance $R_{R1}$ of the discharge resistance unit 140 or as illustrated in FIG. 2A, the discharge resistance conversion circuit 150 is connected in parallel to a resistance $R_{R2}$ of the discharge resistance unit 140.

Figure 3:
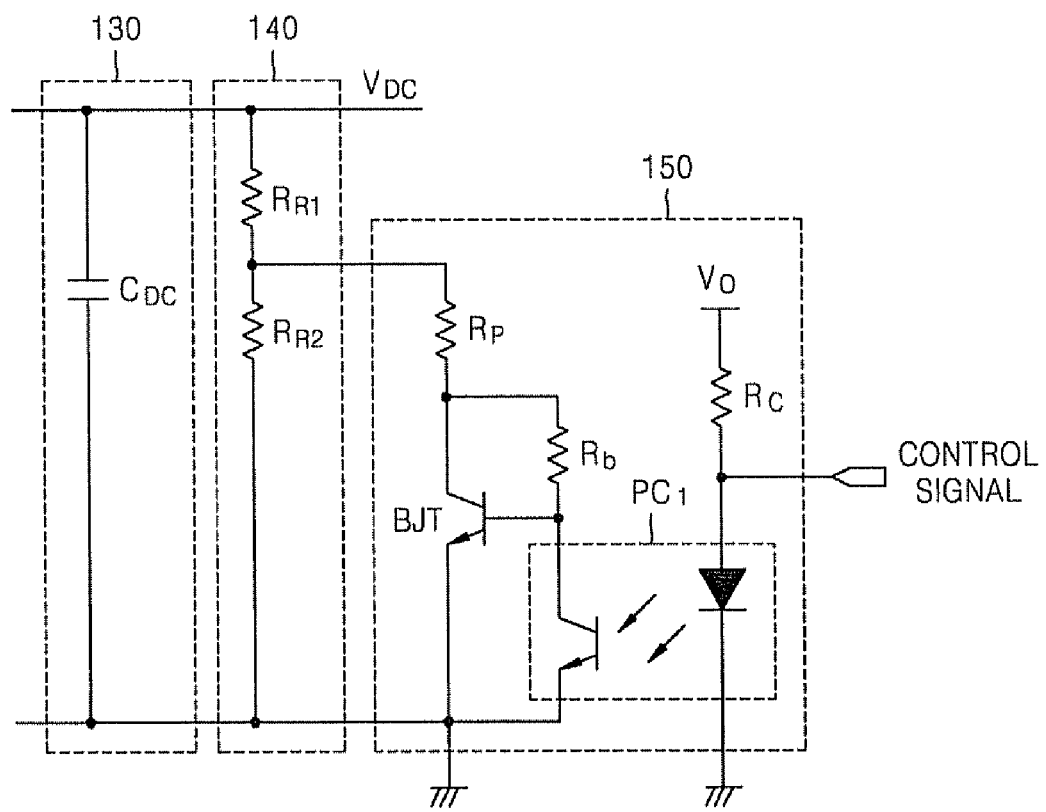
FIG. 3 is a circuit diagram for explaining a discharge resistance conversion circuit illustrated in FIGS. 2A and 2B according to an embodiment of the present invention.

FIG. 3 is a circuit diagram for explaining the discharge resistance conversion circuit 150 illustrated in FIG. 2A according to an embodiment of the present invention. However, FIG. 3 may also apply to the discharge resistance conversion circuit 150 illustrated in FIG. 2B.

A first resistance $R_P$ is connected in parallel to the resistance $R_{R2}$ of the discharge resistance unit 140. The first resistance $R_P$ has a resistance value less than that of the equivalent resistance of the discharge resistance unit 140 by a predetermined value. When the first resistance $R_P$ is sufficiently less than the resistance $R_{R2}$ of the discharge resistance unit 140, a power consumed in a standby mode is significantly less than a discharge power consumed in a normal operation mode. Therefore, a desired discharge performance can be obtained, and the power consumed by the discharge resistance unit 140 in the standby mode of the power supply apparatus can be significantly reduced.

A switching unit is connected to the first resistance $R_P$ and performs a switching operation according to an externally received control signal. As illustrated in FIG. 3, the switching unit includes a bipolar junction transistor (BJT), a second resistance $R_b$, a first photo coupler $PC_1$, and a third resistance $R_c$.

The BJT is an npn type or a pnp type. According to the current embodiment of the present invention, the npn BJT is employed and the npn BJT includes a collector connected to the first resistance $R_P$ in series. In addition, the second resistance $R_b$ is connected between a base of the npn BJT and the first resistance $R_P$, and the second resistance $R_b$ has a resistance value so as to operate the npn BJT. The first photo coupler $PC_1$ is connected to the second resistance $R_b$ and the base of the npn BJT. The third resistance $R_c$ is connected to the first photo coupler $PC_1$. In addition, a control signal is received through a node for connecting the third resistance $R_c$ and the first photo coupler $PC_1$. A controller (not shown) outputs a control signal corresponding to the normal operation mode or the standby mode, and the control signal functions as a ground signal in the normal operation mode and functions as a high impedance signal in the standby mode. The normal operation mode is a mode in which functions of a system are performed. For example, the normal operation mode of a printer is a mode for performing a printing operation. The control signal in the normal operation mode provides a signal in a ground state. The standby mode is a sleep mode for saving the power of the system. In the standby mode, the control signal provides a load signal having high impedance.

In the normal operation mode, the control signal that functions as the ground signal is received, so that a current does not flow through the first photo coupler $PC_1$, and thus, the first photo coupler $PC_1$ is not turned on. Thus, a current flowing through the second resistance $R_b$ is supplied to the base of the npn BJT, so that the npn BJT is turned on. Accordingly, a consumed power is obtained by the following Equation 1.

$$P_{normal} = \frac{V_{DC}^2}{R_{R1} + (R_{R2} // R_P)} \quad \text{[Equation 1]}$$

Here, $P_{normal}$ represents the power consumed in the normal operation mode.

However, in the standby mode, the control signal that functions as the high impedance signal is received, so that the current flows through the first photo coupler $PC_1$, and thus, the first photo coupler $PC_1$ is turned on, and the base of the npn BJT is grounded and turned off. Accordingly, a consumed power is obtained by the following Equation 2.

$$P_{standby-BJT} = \frac{V_{DC}^2}{R_{R1} + [R_{R2} // (R_P + R_b)]} \quad \text{[Equation 2]}$$

Here, $P_{standby-BJT}$ represents a power consumed in the standby mode.

As represented by Equation 2, the power consumed in the standby mode can be minimized as compared with a conventional system.

Figure 4:
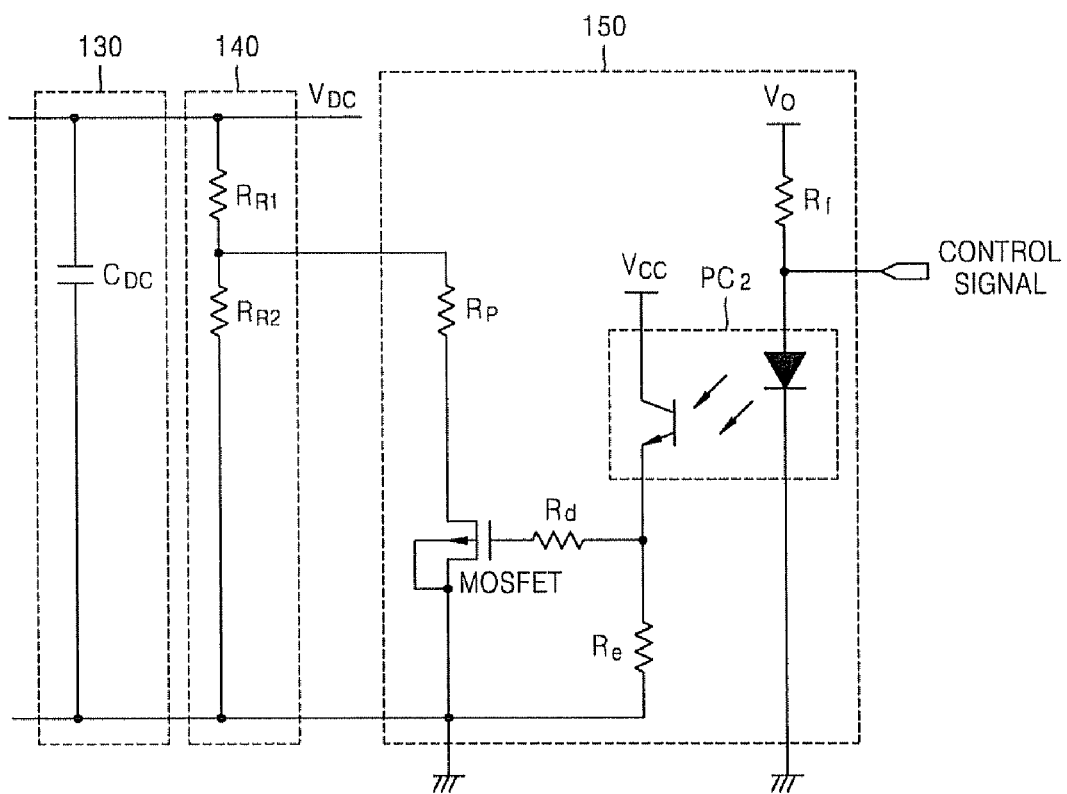
FIG. 4 is a circuit diagram for explaining a discharge resistance conversion circuit illustrated in FIGS. 2A and 2B according to another embodiment of the present invention.

FIG. 4 is a circuit diagram for explaining the discharge resistance conversion circuit 150 illustrated in FIG. 2A according to another embodiment of the present invention. FIG. 4 illustrates the embodiment illustrated in FIG. 2A. However, FIG. 4 may also apply to the discharge resistance conversion circuit 150 illustrated in FIG. 2B.

Similar to FIG. 3, the first resistance $R_P$ is connected to the resistance $R_{R2}$ of the discharge resistance unit 140 in parallel, and the first resistance $R_P$ has a resistance value that is less than that of the equivalent resistance of the discharge resistance unit 140 by a predetermined value. When the first resistance $R_P$ is sufficiently less than the resistance $R_{R2}$ of the discharge resistance unit 140, a power significantly less than a discharge power consumed in the normal operation mode is consumed in the standby mode.

A switching unit is connected to the first resistance $R_P$ and performs a switching operation according to an externally received control signal. As illustrated in FIG. 4, the switching unit includes a metal-oxide semiconductor field effect transistor (MOSFET), a fourth resistance $R_d$, a fifth resistance $R_e$, a second photo coupler $PC_2$, and a sixth resistance $R_f$.

The MOSFET is connected to the first resistance $R_p$, and the fourth resistance $R_d$ is connected to a gate of the MOSFET. The fifth resistance $R_e$ is connected to the fourth resistance $R_d$, and has a resistance value so as to operate the MOSFET.

The second photo coupler $PC_2$ is connected to the fourth resistance $R_d$ and the fifth resistance $R_e$. The sixth resistance $R_f$ is connected to the second photo coupler $PC_2$. In addition, a control signal is received through a node for connecting the sixth resistance $R_f$ and the second photo coupler $PC_2$. A controller (not shown) outputs a control signal corresponding to the normal operation mode or the standby mode, and which functions as a ground signal in the normal operation mode and functions as a high impedance signal in the standby mode. In the normal operation mode, the control signal provides a signal in a ground state. In the standby mode, the control signal provides a load signal having high impedance.

In the normal operation mode, the control signal that functions as the ground signal is received, so that a current does not flow through the second photo coupler $PC_2$, and thus, the second photo coupler $PC_2$ is not turned on. Thus, the gate of the MOSFET is not applied with a supply voltage $V_{cc}$, and the MOSFET is turned on. Accordingly, the consumed power is obtained by the aforementioned Equation 1.

However, in the standby mode, the control signal that functions as the high impedance signal is received, a current is supplied to the second photo coupler $PC_2$, and the second photo coupler $PC_2$ is turned on, and the gate of the MOSFET is applied with the supply voltage, so that the MOSFET is turned off. Accordingly, the consumed power is obtained by the following Equation 3.

$$P_{standby\text{-}MOSFET} = \frac{V_{DC}^2}{R_{R1}+R_{R2}} + \frac{V_{cc}^2}{R_e} \quad \text{[Equation 3]}$$

Here, $P_{standby\text{-}MOSFET}$ represents a power consumed in the standby mode.

As represented by Equation 3, the power consumed in the standby mode can be minimized as compared with the conventional system.

When comparing the embodiment illustrated in FIG. 3 and the embodiment illustrated in FIG. 4, the voltage $V_{cc}$ of the second embodiment is significantly less than the voltage $V_{DC}$, of the first embodiment, so that the power loss in the second embodiment is less than that in the first embodiment.

The power supply input device according to the embodiment of the present invention includes a resistance connected in parallel to a discharge resistance unit and performs a switching operation according to a control signal, thus minimizing the power loss that occurs when the system is in the standby mode.

The power supply input device according to an embodiment of the present invention has been particularly shown and described with reference to exemplary embodiments illustrated in the attached drawings. However, it will be understood by those skilled in the art that various changes in form and details may be made therein without departing from the spirit and scope of the present invention as defined by the appended claims.

What is claimed is:

1. A power supply input device including an AC (alternating current) power supply unit, a bridge diode, a DC (direct current) condenser, and a discharge resistance unit, comprising:
   a first resistance connected to the discharge resistance unit in parallel; and
   a switching unit connected to the first resistance and performing a switching operation according to an externally received control signal, the control signal selectively corresponding to a normal operation mode of a power supply system of the power supply input device and a standby mode of the power supply system, the control signal functioning as a ground signal in the normal operation mode to prevent current from flowing through a portion of the switching unit and functioning as a high impedance signal in the standby mode to allow current to flow through the portion of the switching unit,
   wherein when the control signal functions as the high impedance signal in the standby mode, a power consumed in the standby mode is less than a power consumed in the normal operation mode, and
   the switching unit includes
     a bipolar junction transistor connected to the first resistance;
     a second resistance connected between a base of the bipolar junction transistor and the first resistance;
     a first photo coupler connected to the second resistance; and
     a third resistance connected to the first photo coupler.

2. The device of claim 1, wherein a resistance value of the first resistance is less than a resistance value of the discharge resistance unit by a predetermined value.

3. The device of claim 1, wherein the second resistance has a value so as to operate the bipolar junction transistor.

4. The device of claim 1, wherein in the normal operation mode, a current that flows through the first photo coupler is blocked, and the bipolar junction transistor is turned on.

5. The device of claim 1, wherein in the standby mode, a current is supplied to the first photo coupler, and the bipolar junction transistor is turned off.

6. A power supply input device including an AC (alternating current) power supply unit, a bridge diode, a DC (direct current) condenser, and a discharge resistance unit, comprising:
   a first resistance connected to the discharge resistance unit in parallel; and
   a switching unit connected to the first resistance and performing a switching operation according to an externally received control signal, the control signal selectively corresponding to a normal operation mode of a power supply system of the power supply input device and a standby mode of the power supply system, the control signal functioning as a ground signal in the normal operation mode to prevent current from flowing through a portion of the switching unit and functioning as a high impedance signal in the standby mode to allow current to flow through the portion of the switching unit,
   wherein when the control signal functions as the high impedance signal in the standby mode, a power consumed in the standby mode is less than a power consumed in the normal operation mode, and
   the switching unit includes
     a MOSFET (metal-oxide semiconductor field effect transistor) connected to the first resistance;
     a second resistance connected to a gate of the MOSFET;
     a third resistance connected to the fourth resistance;

a second photo coupler connected to the fourth and fifth resistances; and a fourth resistance connected to the second photo coupler.

7. The device of claim 6, wherein the third resistance has a resistance value so as to operate the MOSFET.

8. The device of claim 6, wherein the control signal functions as a ground signal in a normal operation mode, and functions as a high impedance signal in a standby mode.

9. The device of claim 8, wherein in the normal operation mode, a current that flows through the second photo coupler is blocked, and the MOSFET is turned on.

10. The device of claim 8, wherein in the standby mode, a current is supplied to the second photo coupler, and the MOSFET is turned off.

\* \* \* \* \*